May 12, 1964  R. F. THIELMAN  3,132,478
SOLID PROPELLANT GAS ROTARY VALVE
Filed July 13, 1961  4 Sheets-Sheet 1

INVENTOR.
Russell F. Thielman
BY
ATTORNEYS

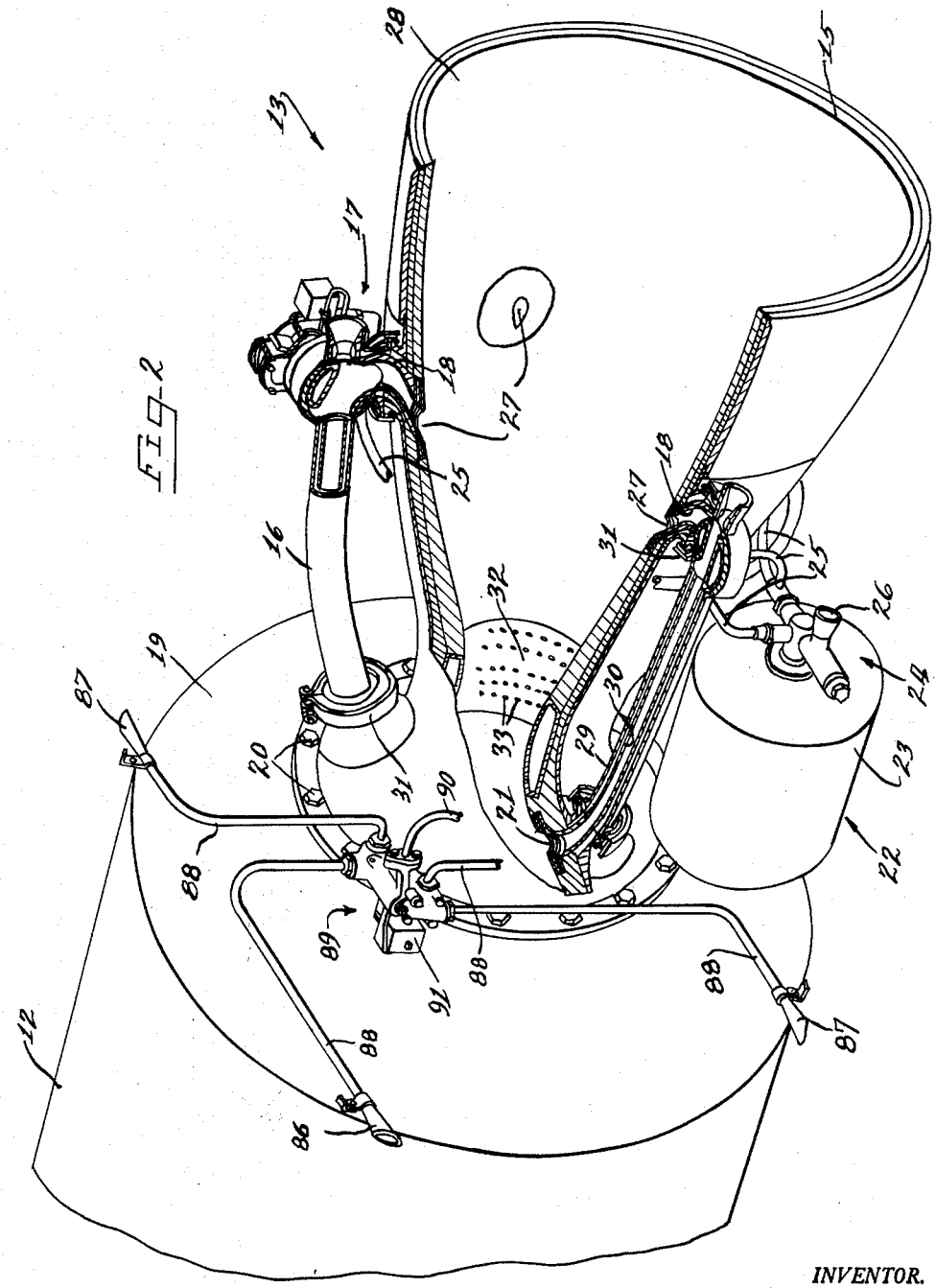

INVENTOR.
Russell F. Thielman
BY
ATTORNEYS

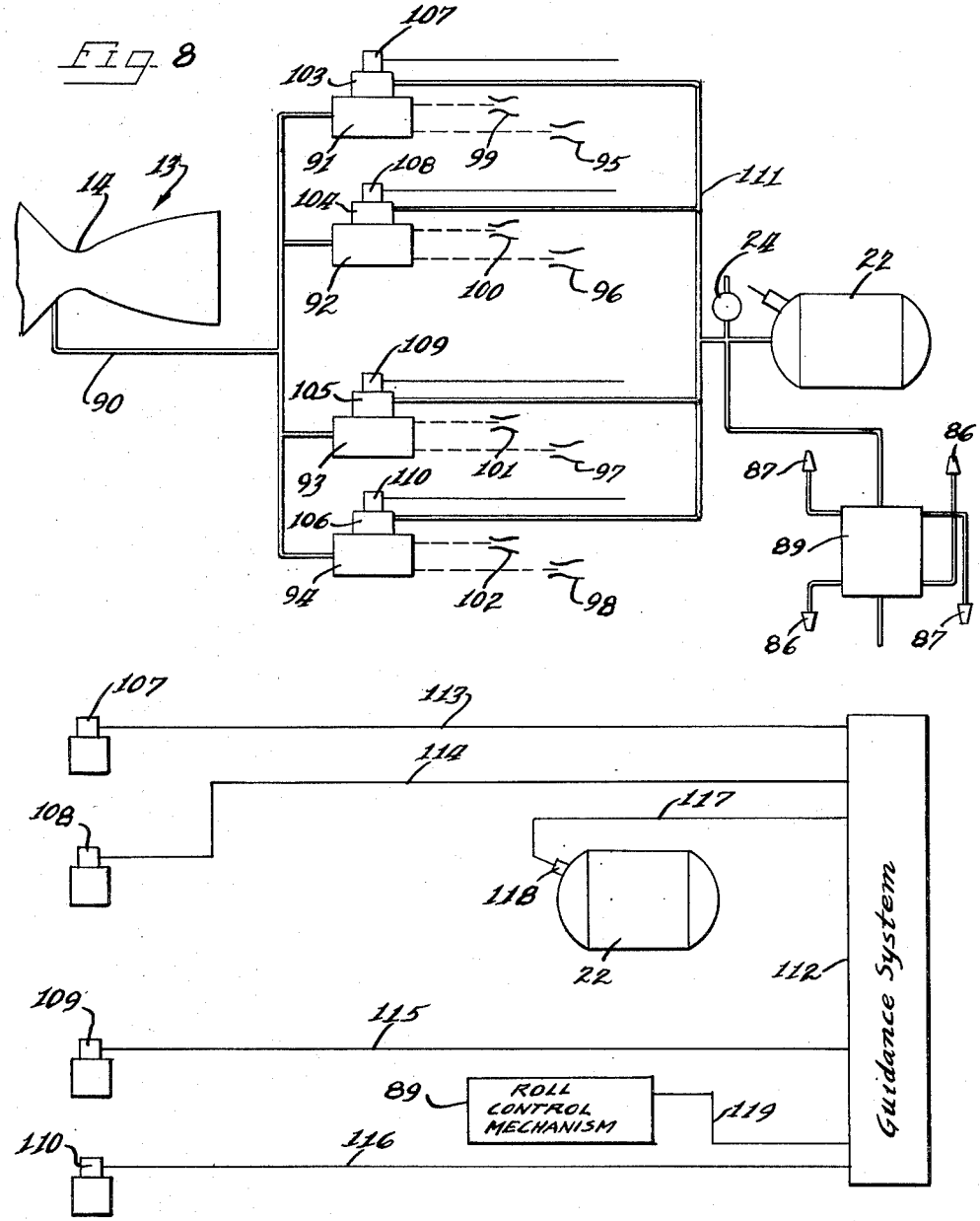

United States Patent Office 3,132,478
Patented May 12, 1964

3,132,478
SOLID PROPELLANT GAS ROTARY VALVE
Russell F. Thielman, Cleveland, Ohio, assignor to Thompson Ramo Wooldridge Inc., Cleveland, Ohio, a corporation of Ohio
Filed July 13, 1961, Ser. No. 123,691
3 Claims. (Cl. 60—35.54)

This invention relates to air and space borne vehicles, such as missiles, rockets, satellites, nose cones and the like, and is more particularly directed to improved methods and means for controlling the attitude of such a vehicle in flight.

The attitude of vehicles that are propelled by solid propellant rocket motors has been controlled by such means as jet vanes, jetavators, hinged nozzles and reaction motors, and, more recently, by secondary injection. Under secondary injection techniques, the thrust vector is controlled by utilizing the oblique shock formed in the primary rocket nozzle when a secondary substance is injected into the exhaust flow. Present systems of this type have usually employed inert liquids as the injectant and have used liquid injection valves, but experimental data have shown that the injection of high temperature gases into the primary rocket nozzle produces much stronger oblique shocks and, therefore, greater thrust deflection. The efficiency of the injection process is directly related to the temperature of the gas being injected.

Heretofore, it has not been possible to utilize gases at as high a temperature as would be desired since valve materials of construction have not been capable of handling gases at exceptionally high temperatures. Conventional valve technology is limited at present to approximately 2000° F. One solution to this problem when the main exhaust gases are being used is to introduce a cooling material into the hot gas stream.

A further difficulty is encountered when the exhaust gases of the main thrust producing reaction motor for the vehicle are being used since solid particles or impurities are usually found in solid propellants. They are sometimes intentionally added to a liquid oxidizer or a fuel component to promote burning of this fuel. It is apparent, therefore, that a gas valve for a system that uses the primary exhaust gases to produce an oblique shock in the primary rocket engine nozzle must be capable of operating efficiently and dependably under the extremely high temperatures encountered and not clog up due to particles found in the solid propellant charge.

Accordingly, it is a general object of this invention to provide a valve that is able to withstand extremely high temperatures and is adapted to control the flow of high temperature exhaust gases issuing from the primary reaction motor of an air or space borne vehicle.

It is another object of this invention to provide such a valve that does not require the use of a cooling fluid to cool the hot exhaust gases entering the valve.

It is still another object of this invention to provide a valve that is adapted to handle high temperature gases which has no sliding surfaces which could stick or clog in the event solid particles are carried by the gas.

It is still another object of this invention to provide such a valve which has no contacting surfaces which coul dweld or be deformed by mechanical closing under the extremely high temperatures encountered during operation.

It is still another object of this invention to provide a valve for high temperature gases which is constructed so that the thermal expansion between movable and stationary parts is equalized in order to prevent binding and sticking.

These and other objects, features and advantages of the present invention may be more apparent from the following detailed description taken in conjunction with the accompanying figures of the drawings, wherein like reference numerals refer to like parts, in which:

FIGURE 2 is an enlarged view of a portion of the vehicle with some parts broken away to better illustrate the details of the thrust vector control system;

FIGURE 8 is a schematic diagram illustrating the thrust vector control system; and FIGURE 9 is another schematic diagram of the control system.

As shown on the drawings:

Figure 1:
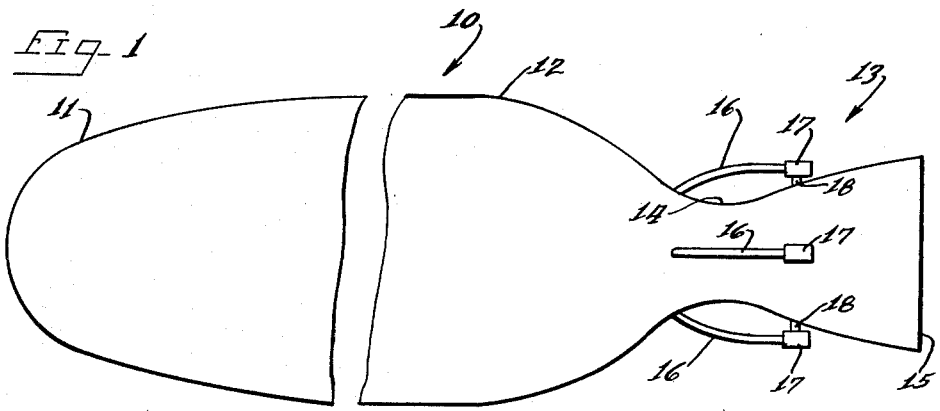
FIGURE 1 is a view of an air or space borne vehicle constructed in accordance with this invention.

With reference to FIGURE 1, there is illustrated an air or space borne vehicle generally indicated by the numeral 10 that includes a front end portion 11 and a rear or discharge portion 12. The front end portion 11 ordinarily houses the guidance and related components while the rear or discharge portion 12 ordinarily houses the main reaction motor of the vehicle. The reaction chamber of the motor communicates with a gas discharge nozzle 13. This nozzle 13 is a convergent-divergent type which has a throat section 14 and a gas exit section 15.

The attitude of the vehicle 11 is controlled by bleeding off a portion of the primary exhaust flow ahead of the throat 14 and injecting the gases bled off into the primary exhaust flow at a point in the nozzle 13 between the throat 14 and the exit 15. The bleed gases pass through four conduits 16, three of which are shown in FIGURE 1, which have their input ends in communication with the combustion chamber of the reaction motor. The flow of the gases through the four conduits 16 is controlled by four valve assemblies 17 which are identically constructed. Four ducts 18 carry the gases leaving the valves 17 to a plurality of openings 27, FIGURE 2, formed in the wall of the nozzle 13.

The nozzle 13 is made substantially circular in cross section and the four conduits 16 and valves 17 are symmetrically located at 90° intervals around the nozzle. It is apparent that if one of the valves 17 is in the operative condition where it passes gas from the combustion chamber of the main rocket motor to the side of the nozzle 13 while the other three valves 17 are closed to such flow, the direction of the thrust vector of the primary flow of exhaust gases will change and cause the attitude of the vehicle 10 to change. When hot gases enter the nozzle 13 by way of one of the ducts 18, the main rocket exhaust gas deflects away from this duct and causes the thrust vector to change.

With reference to FIGURE 2, the converging portion 19 of the rear portion 12 of the vehicle forms the entrance to the nozzle 13 and is fastened to the nozzle by a plurality of bolts 20. Just prior to the throat section 14 of the nozzle 13 is formed a plurality of inlets 21 which bleed off a portion of the exhaust gases generated in the reaction chamber. These gases flow through the conduits 16 to the valve assemblies 17 which direct the bleed gases either into the nozzle 13 or into secondary or bypass nozzles 26 fastened to the valves 17.

The valve assemblies 17 are operated by a gas source 22. This source includes a container 23 that is preferably charged with a solid fuel (not shown), and a relief valve mechanism 24. This source 22, which is under the control of the missile guidance system, generates gas under pressure which flows through four lines 25 to four rotary actuators which are attached to each of the valve assemblies 17. These rotary actuators, which will be discussed in greater detail hereinafter, control the operation of the valve assemblies 17 in response to signals received from the missile guidance system.

The relief valve assembly 24 for the gas source is designed to release a quantity of the gas generated through the nozzle 26 in the event the gas pressure rises above a predetermined upper limit.

The nozzle 13 and the reaction motor may be constructed of conventional materials. The openings 21 and 27 in the nozzle 13 through which the bleed gases flow may be formed by a series of apertured laminations which are inserted into an opening formed in the nozzle wall. These laminated inserts may be formed in the manner described in the copending U.S. patent application of Russell F. Thielman Ser. No. 96,201, filed March 16, 1961. As described in that application, the laminated inserts include a plurality of high temperature refractory metal wafers which are interleaved with a plurality of thin wafers of an insulating plastic material such as phenolic resin. The laminated inserts are bonded together by a low melting point adhesive. This laminated insert construction has the advantage that it diminishes in thickness with and at the same rate as the inner surface of the nozzle wall 28.

The conduits 16 and the ducts 18 are formed of conventional materials and may include an outer layer 29 of metal and an inner layer 30 of a refractory material. In the event the conduits 16 and the ducts 18 are formed in a number of sections, these sections are held together by a plurality of conventional clamps 31.

A hollow insert 32, well known in the art, is disposed at the throat portion 14 of the nozzle 13. This insert is adapted to contain a cooling material, and a plurality of orifices 33 are formed in the inner wall of the insert 32 which place its hollow interior in communication with the threat portion of the nozzle. This coolant material is a type that is well known in the art and is heated by the heat transferred into the insert 32 from the rocket gases. This coolant material absorbs heat as it rises to boiling temperature. When it reaches an equilibrium condition, the amount of vapor being boiled off equals the amount of vapor allowed to escape through the orifices 33, with the result that boundary layer cooling is provided.

Figure 3:
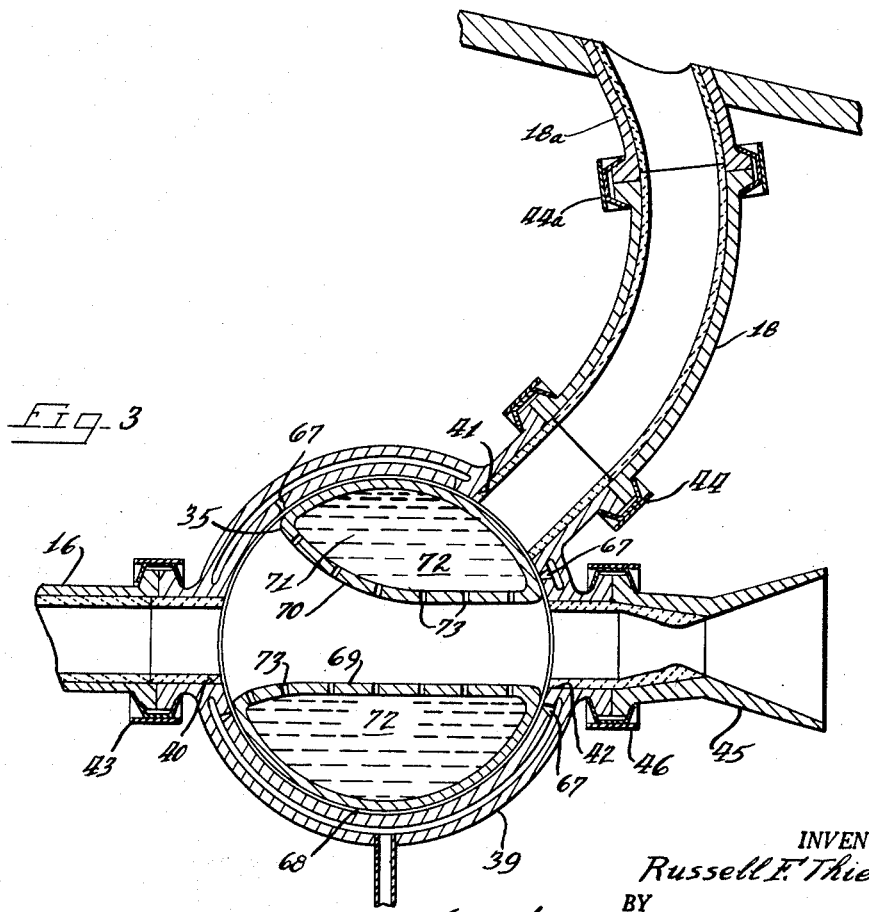
FIGURE 3 is a sectional view of a valve constructed in accordance with the invention.
Figure 4:
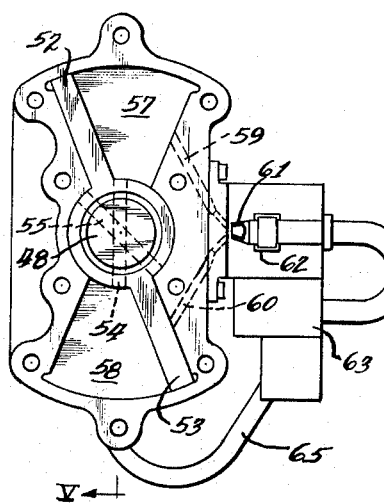
FIGURE 4 is another view of the valve showing the actuator rotor.
Figure 5:
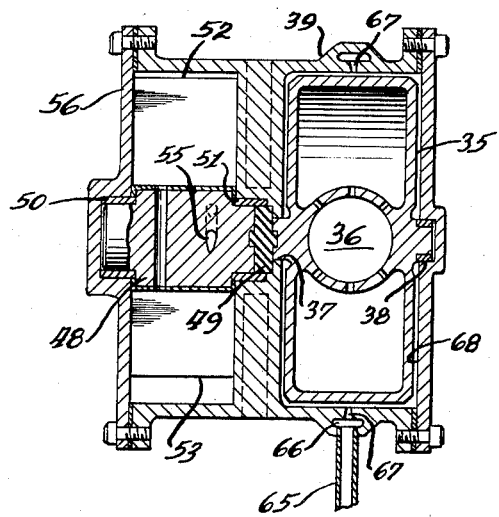
FIGURE 5 is a sectional view taken along the line V—V of FIGURE 4.

With reference to FIGURES 3, 4 and 5, the valve assembly 17 includes a rotating cylinder 35 which has a rocket gas flow passage 36 formed in it. The cylinder 35 is pivotally mounted at the points 37 and 38 within a valve housing 39.

The valve housing 39 is also cylindrical and has an inlet opening 40 formed in one side, a first outlet opening 41 formed in the other side and, in the embodiment of the invention illustrated in FIGURES 3–5, a second outlet opening 42. The housing 39 is connected to a conduit 16 by a clamp 43, to the duct 18 by a clamp 44, and to a conventional convergent-divergent bypass nozzle 45 by still another clamp 46.

The arrangement shown in FIGURE 3 is slightly different than that shown in FIGURE 2 in that both of the fluid passageways 16 and 18 are made in three sections rather than two. The duct 18 includes an additional section 18a and a clamp 44a, and the portion of the main nozzle 13 around the opening 27 is not laminated.

The valve assembly illustrated in FIGURES 3–5 is in the bypass position wherein the main rocket engine exhaust gases flowing through the conduit 16 will flow directly through the flow passage 36, see FIGURE 3, and out of the valve assembly through the bypass nozzle 45. If the cylinder 35 is rotated approximately 45° in the counterclockwise direction as seen in FIGURE 3, the exhaust gases flowing through the conduit 16 will still flow into the flow passage 36 formed in the cylinder 35 but in this position they will be guided by the valve into the duct 18. This operational position of the valve is shown by the uppermost valve assembly in FIGURE 2. The input side of the flow passage 36 formed in the cylinder 35 is made wide enough so that it will receive the gases flowing from the conduit 16 regardless of the position of the rotatable cylinder 35.

The cylinder 35 is rotated or pivoted between the bypass position and the operational position by a rotary actuator 47, illustrated in detail in FIGURES 4 and 5. This actuator includes an actuator rotor 48 which is connected to the cylinder 35 by a bonded insulator 49. The rotor shaft 48 is pivotally mounted in the valve housing 39 on two sleeve bearings 50 and 51.

Extending radially outwardly from the rotor shaft 48 are two vanes 52 and 53 which are formed on opposite sides of the rotor 48. Also, two fluid passageways 54 and 55 are formed through the rotor 48 which have their outlets on different sides of the vanes 52 and 53.

The valve assembly as seen in FIGURE 4 is with the rotary actuator cover plate 56 removed. The actuator portion of the housing 39 is formed with two cavities 57 and 58 which receive the vanes 52 and 53, respectively. The actuator portion of the housing 39 also has two passages 59 and 60 which connect the two cavities 57 and 58, respectively, to the exterior of the housing. The ends of the passages 59 and 60 that are at the exterior of the housing are closely adjacent each other and a jet pipe nozzle 61 is mounted adjacent the ends of the two passages 59 and 60. The jet pipe 64 is connected by a clamp 62 to a torque motor 63 that is adapaed to vary the position of the jet pipe nozzle 61 between the two passages 59 and 60. The torque motor 63 is electrically connected to be under the control of the guidance system for the vehicle, and the jet pipe 64 is connected to one of the lines 25 that leads to the outlet of the gas source 22.

In operation, assume that the gas source 22 is operating and a supply of gas under pressure is flowing through the lines 25 to the nozzle 61 of the jet pipe. If the nozzle 61 is positioned, by the torque motor 63, adjacent the upper passage 59, pressure will build up in the cavity 57 on the clockwise side of the vane 52 and in the cavity 58 on the clockwise side of the vane 53. This condition forces the rotor 48 and the cylinder 35 in the counterclockwise direction as seen in FIGURE 4. Gas within the cavity 57 flows into the cavity 58 through the fluid passageway 54 and exerts force on the vane 53.

When the cylinder 35 is to be placed in the other position, a signal received from the missile guidance system causes the torque motor 63 to move the nozzle 61 of the jet pipe until it is adjacent the passage 60. With the nozzle 61 away from the passage 59, it is placed at atmospheric pressure and a force is applied against the counterclockwise side of the vane 53 which causes the rotor 48 to move in a clockwise direction. The gas in the cavities 57 and 58 on the clockwise side of the vanes 52 and 53 passes out of the housing 39 through the passages 54 and 59. After the rotor 48 has rotated a certain distance in the clockwise direction, fluid flows through the passage 55 formed in the rotor 48 into the portion of the cavity 57 that is on the counterclockwise side of the vane 52. As the rotor 48 turns, of course, the rotating cylinder 35 also turns and places the valve assembly in the position opposite to that previously attaining.

It is apparent, therefore, that the position of the rotating cylinder 35 in each valve assembly and the flow of the gas through the conduit 16 is controlled by the position of the nozzle 61 of the jet pipe which in turn is under the control of the missile guidance system. By sending appropriate signals from the missile guidance system, the four torque motors 63 and the valve assemblies can be activated to produce secondary injection at one or more of the openings 27 in order to change the direction of the thrust vector.

To further cool the portion of the valve assembly through which the extremely hot main exhaust gases are flowing, a portion of the gas output from the gas source 22 is fed to a conduit 65, FIGURES 3–5, that is coupled to the valve housing 39. This conduit 65 leads to an annular fluid passageway 66 formed in the housing 39. At the parts of the housing 39 where the openings 40, 41 and 42 are formed, the route of the passageway 66 is deflected around these openings 40–42 in order to place all of the portions of the passageway 66 seen in FIGURE 3 in communication.

A plurality of orifices 67 are also formed in the housing 39 which place the annular passageway 66 in communication with the interior of the housing. Also, the outer diameter of the rotating cylinder 35 is made slightly smaller than the inner diameter of the housing 39 in order to leave a slight clearance space 68 between these two members.

In operation, the gas from the source 22, which is relatively cool as compared to the main rocket engine exhaust gases, flows through the conduit 65 into the annular fluid passageway 66. This fluid leaves the passageway 66 through the orifices 67 and enters the clearance 68 between the housing 39 and the cylinder 35. This gas then flows around the exterior of the cylinder 35 and enters the main flow passage 36 and mixes with the rocket exhaust gases. Since the pressure of the gas leaving the source 22 and flowing through the conduit 65 is greater than the pressure of the main rocket engine exhaust gas, the flow occurs from the conduit 65 into the flow passage 36, thereby cooling the exterior of the cylinder 35 and preventing deposition of solid particles in the clearance space 68. The higher pressure cooling gas also serves as a seal.

The surfaces 69 and 70 of the cylinder 35 which are in contact with the engine exhaust gas flow are further cooled by a coolant 71 that is disposed in the hollow interior 72 of the cylinder 35. This coolant material 71 is also a conventional type that is heated to boiling temperature by the heat absorbed from the rocket gas. Once again, when the coolant reaches an equilibrium condition the amount of vapor being boiled off equals the amount of vapor allowed to escape through a plurality of orifices 73 formed in the two surfaces 69 and 70 of the cylinder 35. The two surfaces 69 and 70 are, therefore, cooled by boundary layer cooling.

Figure 6:
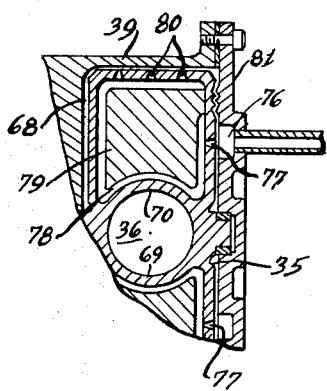
FIGURE 6 is a sectional view showing an alternative construction of the valve.

In the embodiment of the invention illustrated in FIGURE 6, cooling of the surfaces 69 and 70 adjacent the flow passage 36 is provided by passing a portion of the relatively cool gas from the source 22 through the interior of the cylinder 35. The source 22 is connected by a conduit 75 to an annular duct 76 formed in the housing 39. A plurality of orifices 77 are formed in the side of the cylinder 35 adjacent the annular duct 76 which allow the gases from the duct 76 to circulate through a passageway 78 formed in the cylinder 35 around an insert 79 made of an inert material. The cooling gases leave the interior of the cylinder 35 through another plurality of outlet orifices 80 which are formed in the outer wall of the cylinder 35. The gas flow path, therefore, includes the conduit 75, the annular duct 76, the orifices 77, the passageway 78, the orifices 80, the clearance 68, and the main flow passage 36. A labyrinth 81 is formed between the side wall of the cylinder 35 and the interior of the valve housing 39 in order to separate the gases entering the annular duct 76 from those leaving the orifices 80. A portion of the gases entering the annular duct 76 also passes around the cylinder and enters the rocket gas flow passage 36 directly, in addition to the flow through the orifices 77.

Figure 7:
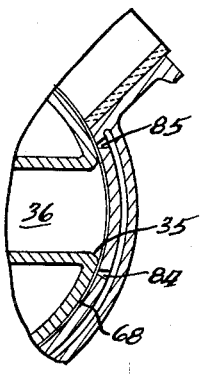
FIGURE 7 is a sectional view showing another alternative construction of the valve.

A valve assembly constructed in accordance with the invention may not have a bypass nozzle as illustrated in FIGURES 3–5. In FIGURE 7 is illustrated a valve assembly wherein the opening 42, FIGURE 3, in the housing 39 is omitted. Two orifices 84 and 85 are formed in the housing which connect the passageway 66 to the clearance space 68 on both sides of the flow passage 36 when the cylinder 35 is in the non-operational position illustrated in FIGURE 7. In the event all four of the valve assemblies are in the non-operational position where the flow of gas through them is completely blocked, none of the main exhaust gas will pass through the conduit 16.

Referring again to FIGURE 2, the system also includes two pairs 86 and 87 of roll control nozzles. These roll control nozzles are connected to a plurality of tubes 88 which are connected to the output of a roll control valve assembly 89. The input to the valve assembly is connected to a tube 90 which runs to the output of the gas source 22 or any other suitable source of gas under pressure. The roll control valve assembly 89 is actuated by a torque motor 91 which, in turn, acts under the control of the guidance system for the vehicle.

FIGURES 8 and 9 are schematic diagrams, FIGURE 8 illustrating the gas flow through the system and FIGURE 9 illustrating the electrical control network. With specific reference to FIGURE 8, a portion of the exhaust gases from the main rocket engine are bled off in front of the throat 14 of the nozzle 13 by a conduit 90 which leads to the four valve assemblies 91–94. It should be understood that only one conduit 90 is illustrated in FIGURE 8 for the simplicity since it is preferable to use four conduits as illustrated in FIGURES 1 and 2. The outputs of the four valve assemblies 91–94 are connected to four nozzles 95–98, respectively, which are disposed in the openings 27, FIGURE 2, in the wall of the missile nozzle 13. In the embodiments of the invention illustrated in FIGURES 3 and 6, four bypass nozzles 99–102 are also connected to the output of said valve assemblies 91–94, respectively. In the embodiment of the invention illustrated in FIGURE 7, of course, the valve assemblies 91–94 stop the flow of the gases from the line 90 when the valve assemblies are placed in the non-operational position.

The four valve assemblies 91–94 are operatively connected to be controlled by four rotary actuators 103–106 which in turn are controlled by four torque motors 107–110. The actuators 103–106 are energized by the gas source 22 which feeds gases through the conduit 111 to the four actuators. The output of the source 22 is also connected to the relief valve assembly 24 and to the input to the roll control valve assembly 89 which has its output connected to the two pairs 86 and 87 of roll control nozzles.

With reference to FIGURE 9, a conventional guidance system 112 for the vehicle has its output connected to the four torque motors 107–110 by four electrical conductors 113–116, respectively. The guidance system 112 is also connected by a conductor 117 to an igniting member 118 such as a squib for the gas source 22. Further, the guidance system is connected by conductor 119 to the servo of the roll control mechanism 89.

It is apparent that a novel and useful apparatus has been provided for controlling the thrust vector of air and space borne vehicles. The apparatus includes means for bleeding off a portion of the gases from the main rocket engine ahead of the nozzle throat for the rocket engine and reinjecting these gases into the nozzle in order to create oblique shock waves at a selected point in the nozzle. By using the primary exhaust gases, the apparatus does not require another auxiliary source of gas to be injected into the nozzle, and, since a very high temperature gas is used, the system operates very efficiently in deflecting the thrust vector.

The apparatus also includes a novel valve assembly which is able to control the flow of the gases which are being injected into the side of the nozzle. This novel valve assembly is constructed such that it will not stick or clog due to the deposition of solid particles in the propellant. It has no contacting surfaces which could weld or be deformed by mechanical closing under the extremely high temperatures encountered during operation, and thermal expansion between movable and stationary parts is equalized in order to prevent binding or sticking. Besides having these advantages, the apparatus is also small, lightweight and simple in operation and construction.

It will be apparent that modifications and variations may be effected without departing from the scope of the novel concepts of the present invention, and it will be understood that this application is limited only by the scope of the appended claims.

I claim as my invention:

1. A system adapted to control the attitude of air and space borne vehicles propelled by the thrust produced by exhaust gases generated in a reaction motor and discharging through an exhaust nozzle, comprising a plurality of bleed openings formed in the rocket motor upstream of the throat of the nozzle, a plurality of injection openings formed downstream of the nozzle throat, a plurality of conduits connecting said bleed openings to said injection openings, and valve means in each said conduit for controlling the flow of hot exhaust gases therethrough, each of said valve means including a housing that has at least an inlet opening and an outlet opening formed therein, a substantially cylindrical member rotatably mounted within said housing, a flow passage formed within said substantially cylindrical member, the interior of said substantially cylindrical member being hollow and containing a coolant, and a plurality of orifices formed in said substantially cylindrical member which place said flow passage in communication with the hollow interior of said substantially cylindrical member, a fluid passageway formed in said housing around said substantially cylindrical member, the outer diameter of said substantially cylindrical member being slightly smaller than the inner diameter of said housing so that a clearance space is provided, and a plurality of orifices formed in said housing between said clearance space and said fluid passageway formed in said housing.

2. A valve assembly adapted to control the flow of extremely hot exhaust gases in an attitude control system for an air and space borne vehicle comprising a housing having an inlet opening and at least a first outlet opening, a cylinder having a hollow interior rotatably mounted within said housing, said cylinder having a flow passage formed therein, means coupled to said cylinder for rotating said cylinder between at least first and second positions, said flow passage being formed such that said inlet opening is placed in communication with said outlet opening when said cylinder is at said first position and said inlet opening being out of communication with said outlet opening when said cylinder is at said second position, an insert mounted in the hollow interior of said cylinder to form a passageway for a coolant material therein, a plurality of inlet orifices formed in said cylinder which lead to said passageway and a plurality of outlet orifices formed in said cylinder which lead to said passageway, a conduit coupled to said housing for said valve assembly which is adapted to be connected to a source of coolant fluid, said conduit leading to a duct formed in said housing which is in communication with said inlet orifices, and a labyrinth formed on said cylinder and on said housing which separates said inlet orifices from said outlet orifices.

3. A rotary valve comprising a substantially cylindrical hollow housing, a substantially cylindrical member rotatably mounted within said housing, an inlet opening and a first outlet opening formed in said housing, a flow passage formed within said substantially cylindrical member, the interior of said substantially cylindrical member being hollow and being adapted to contain a coolant, a plurality of orifices formed in said substantially cylindrical member which place said flow passage in communication with the hollow interior of said substantially cylindrical member, a fluid passageway formed in said housing around said substantially cylindrical member, the outer diameter of said substantially cylindrical member being slightly smaller than the inner diameter of said housing so that a clearance space is provided, and a plurality of orifices formed in said housing between said clearance space and said fluid passageway formed in said housing.

References Cited in the file of this patent

UNITED STATES PATENTS

| 110,087 | Stillson | Dec. 13, 1870 |
|---|---|---|
| 330,796 | McCarty | Nov. 17, 1885 |
| 332,313 | Wilcox | Dec. 15, 1885 |
| 691,975 | Schaaf | Jan. 28, 1902 |
| 1,646,631 | Schnyder | Oct. 25, 1927 |
| 2,024,905 | Bard | Dec. 17, 1935 |
| 2,223,953 | Davis | Dec. 3, 1940 |
| 2,315,058 | Holt | Mar. 30, 1943 |
| 2,354,151 | Skoglund | July 18, 1944 |
| 2,540,594 | Price | Feb. 6, 1951 |
| 2,576,737 | Wendel | Nov. 27, 1951 |
| 2,900,955 | Dickerson et al. | Aug. 25, 1959 |
| 2,914,916 | Gelin et al. | Dec. 1, 1959 |
| 2,916,873 | Walker | Dec. 15, 1959 |
| 2,943,821 | Wetherbee | July 5, 1960 |
| 2,974,594 | Boehm | Mar. 14, 1961 |
| 3,024,596 | Hatfield | Mar. 13, 1962 |
| 3,058,304 | Corbett | Oct. 16, 1962 |
| 3,066,485 | Bertin et al. | Dec. 4, 1962 |

FOREIGN PATENTS

| 879,835 | France | Dec. 10, 1942 |
|---|---|---|
| 1,057,271 | France | Oct. 28, 1953 |
| 1,197,701 | France | June 8, 1959 |
| 1,208,542 | France | Sept. 14, 1959 |
| 251,662 | Germany | July 6, 1911 |
| 223,797 | Great Britain | Oct. 30, 1924 |

OTHER REFERENCES

Sung et al.: (Magazine article) "Reaction Controllers," Control Engineering Magazine, vol. 7, No. 1, page 151, January 1960.